(12) United States Patent
Swasey (10) Patent No.: US 8,984,750 B2
(45) Date of Patent: Mar. 24, 2015

(54) STATIC GASKET WITH WIRE COMPRESSION LIMITER

(75) Inventor: Thomas Swasey, Okemos, MI (US)

(73) Assignee: Federal-Mogul Corporation, Southfield, MI (US)

( * ) Notice: Subject to any disclaimer, the term of this patent is extended or adjusted under 35 U.S.C. 154(b) by 373 days.

(21) Appl. No.: 13/404,188

(22) Filed: Feb. 24, 2012

(65) Prior Publication Data

US 2013/0221623 A1 Aug. 29, 2013

(51) Int. Cl.
*B21D 53/84* (2006.01)
*F16J 15/08* (2006.01)

(52) U.S. Cl.
CPC ...... *F16J 15/0825* (2013.01); *F16J 2015/0862* (2013.01); *Y10T 29/49297* (2013.01)
USPC ...................................... 29/888.3

(58) Field of Classification Search
USPC ...................................... 29/888.3
See application file for complete search history.

(56) References Cited

U.S. PATENT DOCUMENTS

| | | |
|---|---|---|
| 3,606,361 A | 9/1971 | Pohl |
| 4,548,165 A | 10/1985 | Vorobiev |
| 4,817,969 A | 4/1989 | McDowell |
| 4,976,225 A | 12/1990 | Stang et al. |
| 5,106,107 A | 4/1992 | Justus |
| 5,628,113 A | 5/1997 | Tanaka |
| 5,895,054 A | 4/1999 | Miyaoh |
| 6,322,084 B1 | 11/2001 | Yamada |
| 7,311,310 B2 | 12/2007 | Diez |
| 2005/0023768 A1 | 2/2005 | Adams |

FOREIGN PATENT DOCUMENTS

| | | |
|---|---|---|
| DE | 19731491 A1 | 1/1999 |
| EP | 0717218 A1 | 6/1996 |
| FR | 2893521 A1 | 5/2007 |
| JP | 10176752 A | 6/1998 |
| JP | 2001227648 A | 8/2001 |

OTHER PUBLICATIONS

International Search Report, mailed Feb. 14, 2013 (PCT/US2012/064739).

*Primary Examiner* — Moshe Wilensky
(74) *Attorney, Agent, or Firm* — Robert L. Stearns; Dickinson Wright, PLLC (57) ABSTRACT

A static gasket configured for establishing a seal between a cylinder head and an engine block including at least one layer having an opening and at least one compression bead. The compression bead extends circumferentially about the opening and projects out of a plane for deforming elastically when the gasket is compressed between the cylinder head and the engine block. A compression limiter which is formed from a metal wire is disposed radially between the opening and the compression bead for preventing the compression bead from being fully flattened, even if the cylinder head is overloaded onto the engine block. The compression bead is preferably induction and/or resistance welded to at least one of the layer(s).

14 Claims, 8 Drawing Sheets

STATIC GASKET WITH WIRE COMPRESSION LIMITER

BACKGROUND OF THE INVENTION

1. Field of the Invention

The invention relates generally to static gaskets of the type used to establish a gas-tight seal between two members to be clamped together, and more particularly to static gaskets such as cylinder head gaskets.

2. Related Art

In establishing a gas-tight seal between two members to be clamped together, such as a cylinder head and an engine block, it is common to use a static cylinder head gasket having one or more layers. Generally, at least one of the layer(s), sometimes referred to as a functional layer, has a compression bead to establish the fluid tight seal. The gasket may also include at least one distance layer, which may be configured to backload stoppers and limit the compression of the compression bead, thereby improving fatigue resistance. Unfortunately, while fastening the cylinder head to the engine block, the compression bead can be over-compressed and substantially flattened. If the compression bead is over-compressed, in addition to losing its ability to maintain a gas-tight seal, fatigue cracks can form in the area of the compression bead during the initial clamping or while in use. If formed, fatigue cracks ultimately reduce the ability of the static gasket to maintain a gas-tight seal, thereby diminishing the life and performance of the engine.

Some gasket manufacturers have begun producing multi-layer gaskets including compression limiters for preventing, or at least reducing, flattening of the compression bead between the cylinder head and engine block. However, these compression limiters are often costly and laborious to produce or may not sufficiently protect the compression bead from flattening.

SUMMARY OF THE INVENTION

At least one aspect of the present invention provides for a static gasket configured for establishing a seal between a first member, e.g. a cylinder head, and a second member, e.g. an engine block. The gasket includes at least one layer having at least one opening and at least one compression bead projecting out of a plane and extending circumferentially about and spaced from the at least one opening. A compression limiter, which is formed from a metal wire, is disposed radially between the opening and the compression bead of the layer. The compression limiter is induction or resistance welded to the layer. The gasket is advantageous because it provides a stronger, more reliable seal around the cylinder bore, thereby allowing for increased combustion pressures, e.g. through turbo or supercharging, and higher combustion efficiencies. The compression limiter according to this aspect of the invention requires less material and fewer manufacturing steps than other known compression limiters, and therefore, the static gasket is cheaper and easier to manufacture than other known gaskets having compression limiters.

According to another aspect of the present invention, the gasket has a variable topography. This is beneficial because it gives the gasket a variable sealing pressure around the cylinder bore. Thus, the sealing pressure can be increased in certain areas which are most susceptible to the combustion gasses in the cylinder bore, and the sealing pressure can be reduced in areas which are less at risk.

According to yet another aspect of the present invention, a method of forming a static gasket is provided including the steps of drawing a vertical wall into a layer, inserting a wire around the vertical wall, compressing the wire against the layer to at least partially flatten the wire, and resistance or induction welding the wire to the layer. These steps can all be integrated within a stamping press, and therefore, the gasket can be formed very quickly and cheaply. Additionally, the compressing process preferably work-hardens the material of the wire, thereby improving its strength as a compression limiter. After being compressed, the wire preferably has a width of no greater than 1 mm, and therefore, the gasket can be used with engines having very narrow bridges between cylinders without compromising the gasket's sealing ability between those bridges. It is also possible to compress the wire such that it has a textured surface, which may further improve the performance of the gasket.

BRIEF DESCRIPTION OF THE DRAWINGS

These and other features and advantages of the present invention will be readily appreciated, as the same becomes better understood by reference to the following detailed description when considered in connection with the accompanying drawings wherein.

DETAILED DESCRIPTION OF THE ENABLING EMBODIMENTS

Figure 8:
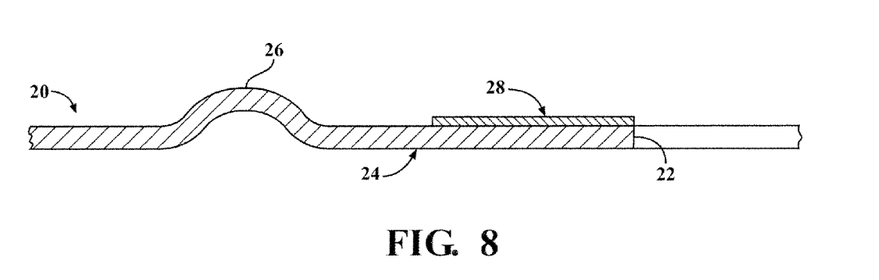
FIG. 8 is a cross-sectional view of the functional layer of FIG. 7 after an embossing operation to give the functional layer a compression bead.

Referring to the Figures, wherein like numerals indicate corresponding parts throughout the several views, a gasket 20 constructed according to one aspect of the present invention and configured for establishing a seal between a cylinder head (not shown) and an engine block (not shown) is illustrated in cross-section in FIG. 8. The gasket 20 includes at least one circular opening 22 surrounding at least one cylinder bore opening in the engine block, as will be appreciated by those of skill in the art. The gasket 20 includes a functional layer 24 having a compression bead 26 spaced radially from the opening 22 for elastically deforming to establish the seal between the cylinder head and the engine block. As will be discussed in further detail below, the gasket 20 also has a compression limiter 28 disposed between the opening 22 and the compression bead 26 for preventing the compression bead 26 from being fully flattened between the cylinder head and the engine block. Although the exemplary gasket 20 is designed for use in an internal combustion engine (not shown), it should be appreciated that the gasket 20 could find uses in a range of automotive or non-automotive applications, i.e. the cylinder head and engine block could be any desirable first and second members.

Figure 1:
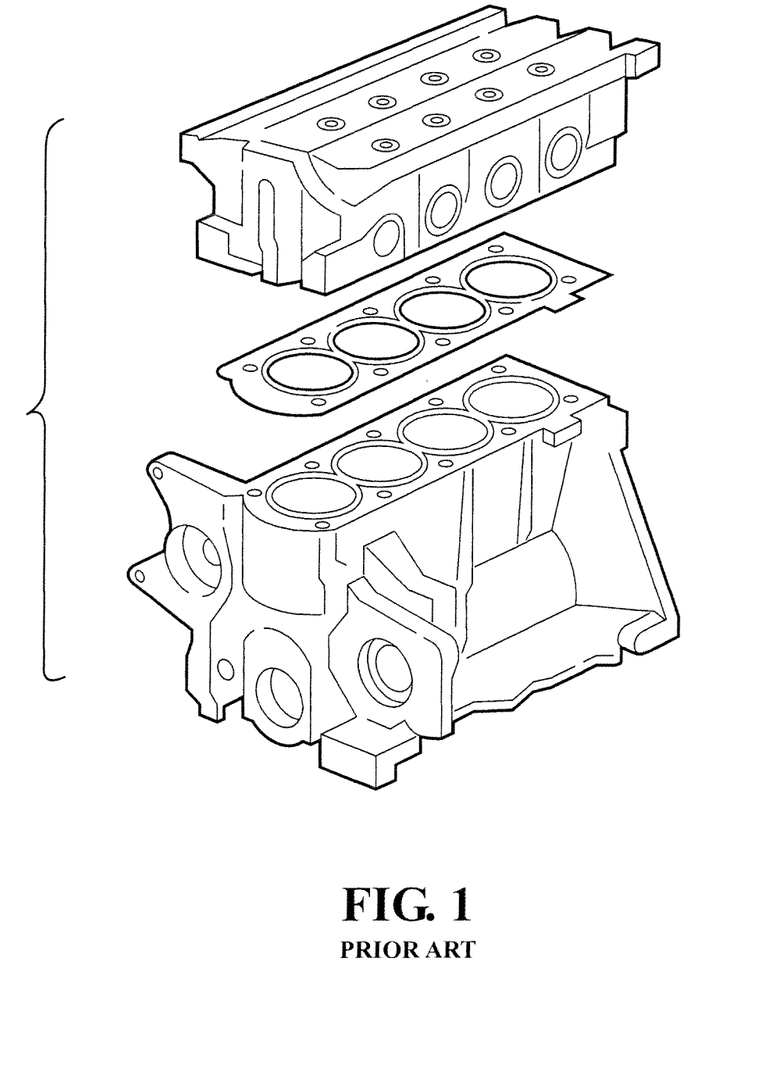
FIG. 1 is a perspective and exploded view of a known engine block and a cylinder head with a static gasket positioned therebetween.
Figure 2:
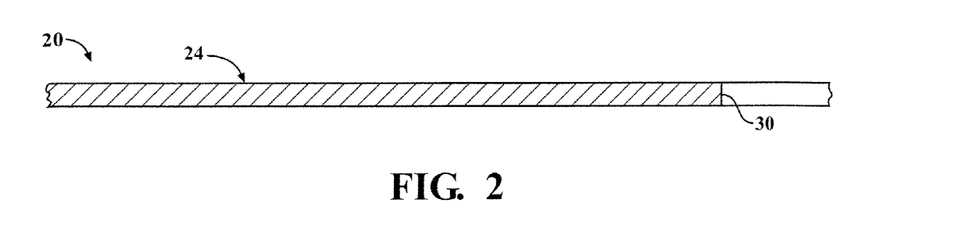
FIG. 2 is a cross-sectional view of an exemplary functional layer after being blanked to have a pilot hole.
Figure 9:
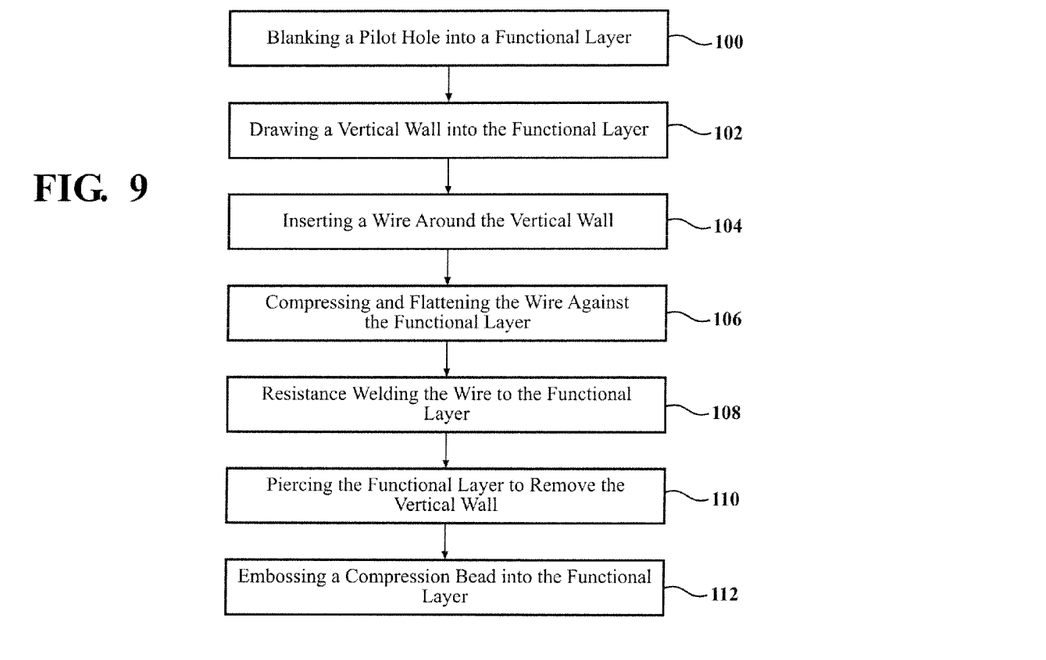
FIG. 9 is a flow chart showing an exemplary method of forming a static gasket.

Referring to the flow chart of FIG. 9, a method of forming a gasket 20 (e.g. the gasket 20 of FIG. 8) in a stamping press is shown. The method starts with the step 100 of blanking a pilot hole 30 into a functional layer 24. The functional layer 24 is preferably formed of a resilient material, such as spring steel. However, it should be appreciated that the functional layer 24 could be of any desirable material and could have any desirable thickness. The exemplary functional layer 24 after the blanking step is generally shown in FIG. 2.

Figure 3:
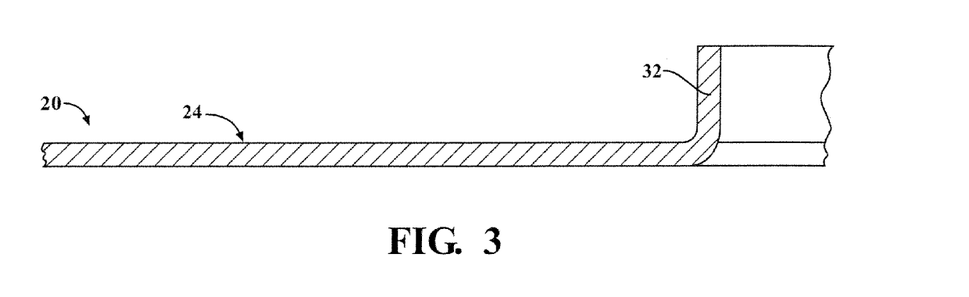
FIG. 3 is a cross-sectional view of the functional layer of FIG. 2 after a drawing step to give the functional layer a vertical wall.
Figure 4:
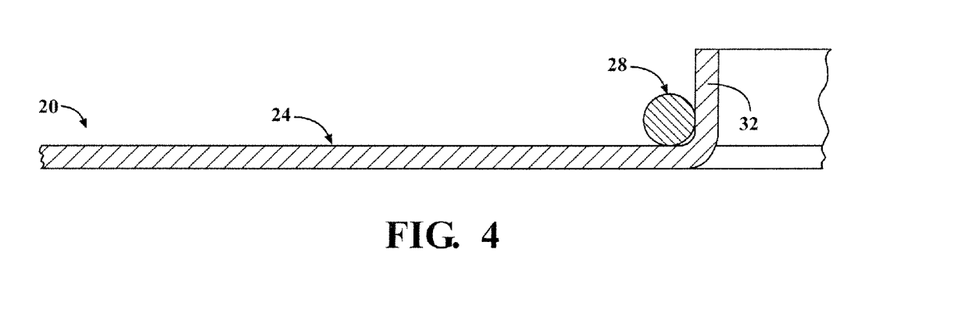
FIG. 4 is a cross-sectional view of the functional layer of FIG. 3 after a wire is placed around the vertical wall.

The method continues with the step 102 of drawing a vertical wall 32 into the functional layer 24 at the pilot hole 30. The exemplary functional layer 24 after the drawing step is generally shown in FIG. 3. It should be appreciated that the steps of blanking the pilot hole 30 and drawing the vertical wall 32 could be performed simultaneously in a "pinch trim" operation. Next, the method proceeds with the step 104 of inserting a wire 28 having an enclosed shape, such as a circle or a square, around the vertical wall 32 of the functional layer 24. The exemplary wire 28 is shown in position around the vertical wall 32 of the functional layer 24 in FIG. 4. The wire 28 is preferably of 0.3 to 0.6 mm thick galvanized steel, but it should be appreciated that the wire 28 could be of a range of other materials and could have any desirable thickness. The wire 28 is preferably formed to the circular shape within the upper die (not shown) of the stamping press, but it could alternately be preformed into the circular shape prior to being inserted into the stamping press.

Figure 5:
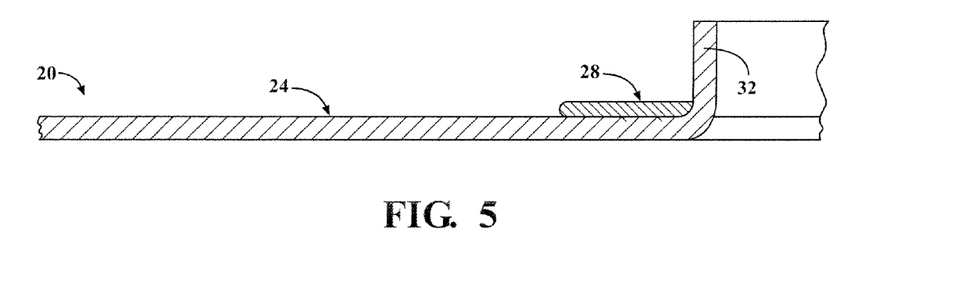
FIG. 5 is a cross-sectional view of the functional layer of FIG. 4 after a first coining operation to flatten the wire.
Figure 6:
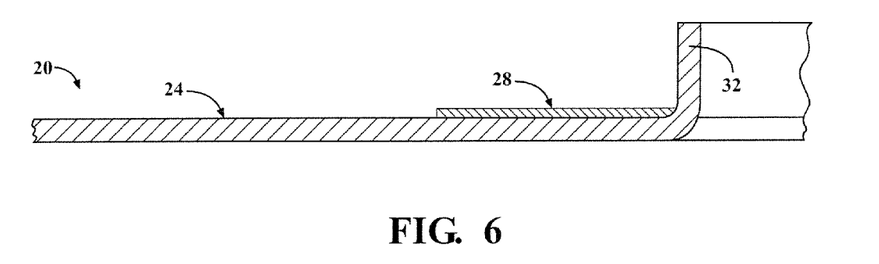
FIG. 6 is a cross-sectional view of the functional layer of FIG. 5 after a second coining operation to further flatten the wire.

The method then proceeds with the step 106 of compressing and flattening the wire 28 against the functional layer 24 to a predetermined thickness. The compressing step preferably includes a pair of coining operations, each of which work hardens and shapes the wire. The exemplary wire 28 is shown after a first coining operation in FIG. 5 and after the second coining operation in FIG. 6. However, it should be appreciated that the wire 28 could be compressed through any desirable process. The predetermined thickness is chosen such that it prevents a full compression bead 26 (discussed below) from being fully flattened between the cylinder head and engine block. The method additionally includes the step 108 of resistance welding the wire 28 to the functional layer 24 to join these components to one another.

Figure 7:
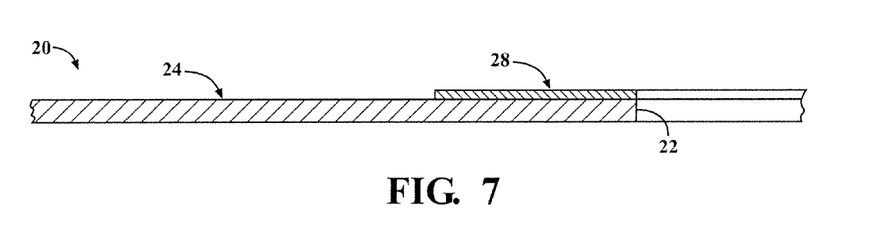
FIG. 7 is a cross-sectional view of the functional layer of FIG. 6 after a piercing operation to remove the vertical wall.

Then, after the wire 28 has been flattened to the predetermined thickness, the method continues with the step 110 of piercing the functional layer 24 to remove the vertical wall 32 and to define a generally circular opening 22 for surrounding a cylinder bore opening 22 in the engine block. FIG. 7 shows the gasket 20 after the vertical wall 32 has been removed. The method also includes the step 112 of embossing a compression bead 26 into the functional layer 24.

Figure 10:
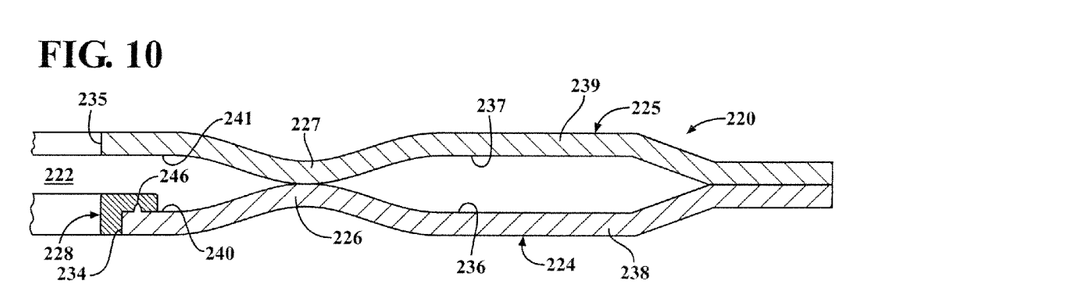
FIG. 10 is a cross-sectional view of another embodiment of the static gasket.

Referring now to FIG. 10, a gasket 220 constructed according to an alternate aspect of the present invention is illustrated in a radial cross-sectional view. The gasket 220 includes a pair of functional layers 224, 225 overlying one another and secured to one another at their outermost peripheries through, for example, welding, brazing or rivets. Each of the functional layers 224, 225 also has an inner periphery 234, 235 defining an opening 222, as will be understood by those of ordinary skill in the art.

Each of the functional layers 224, 225 includes a compression bead 226, 227 extending outwardly from a plane 236, 237 to facilitate a gas-tight seal about the cylinder bore of an engine, thereby preventing combustion fluids or gasses from escaping the cylinder bore between the cylinder head and the engine block. The compression beads 226, 227 are spaced from the inner peripheries 234, 235 and circumferentially surround each opening 222. Each functional layer 224, 225 has a generally planar main body portion 238, 239 extending along the plane 236, 237, and the compression beads 226, 227 extend outwardly from the plane 236, 237 by a predetermined distance. Each functional layer 224, 225 also includes an inner periphery portion 240, 241 extending along the plane 236, 237 between the inner periphery 234, 235 and the compression bead 226, 227.

As with the gasket 20 discussed above, the functional layers 224, 225 are preferably constructed from a resilient metal, such as spring steel, and can have any desirable thickness. As shown in FIG. 10, the functional layers 224, 225 have mirrored profiles facing one another, with each having the aforementioned compression beads 226, 227 facing and being in contact with one another.

A compression limiter 228, which is formed from a wire is disposed at least partially on one of the inner periphery portions 240, 241 between the functional layers 224, 225 for preventing the compression beads 226, 227 from being completely flattened within the plane 236, 237 between the cylinder head to the engine block. Specifically, when the gasket 220 is compressed between the cylinder head and the engine block, the compression limiter 228 holds the inner periphery portions 240, 241 of the adjacent functional layers 224, 225 apart, thereby preventing either of the compression beads 226, 227 from being compressed to a flattened state. Accordingly, both of the compression beads 226, 227 extend outwardly from the plane 236 and remain elastically biased against one another, even if the cylinder head is overloaded onto the engine block. As such, the compression beads 226, 227 are assured of maintaining a generally constant, high sealing pressure against one another, thereby providing and maintaining the gas-tight seal about the circumference of the cylinder bore. In addition to maintaining the desired gas-tight seal about the cylinder bore, the compression beads 226, 227, by not being over-compressed and completely flattened, remain free from the formation of premature fatigue cracks both during assembly and while in use.

Figure 11:
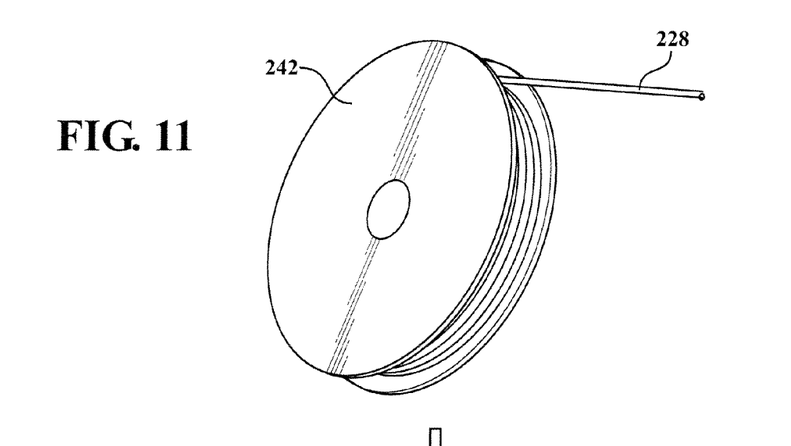
FIG. 11 is a perspective view of an exemplary spool of wire.
Figure 12:
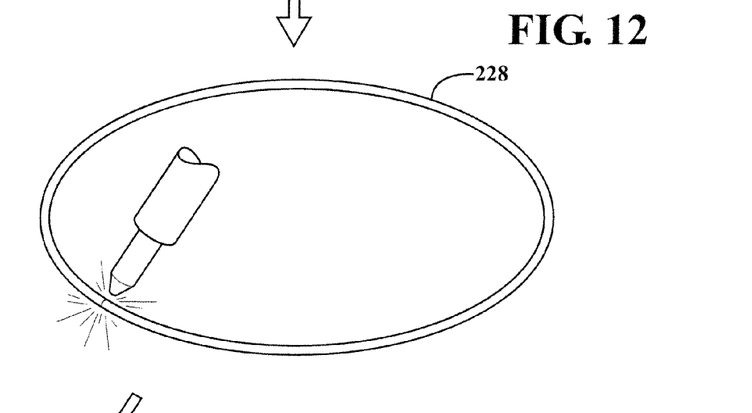
FIG. 12 is a perspective view of the wire of FIG. 11 after being bent into an enclosed shape and having the ends welded together.
Figure 20:
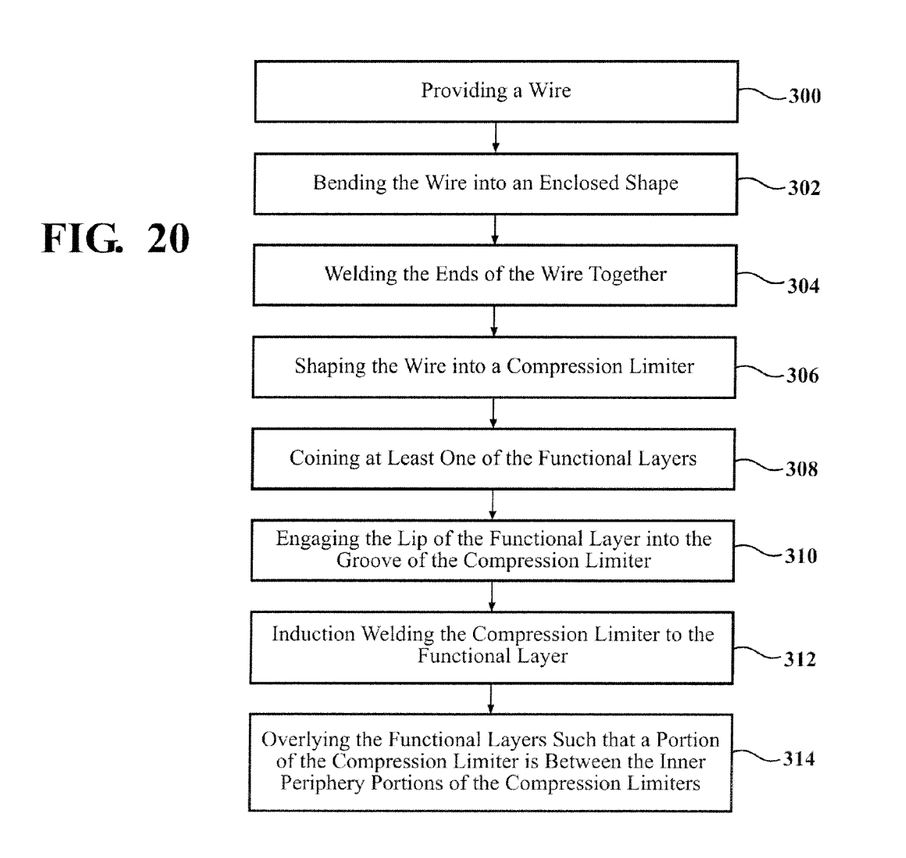
FIG. 20 is a flow chart showing another exemplary method of forming a static gasket.

Referring now to the flow chart of FIG. 20, yet another aspect of the invention provides for a method of forming a multi-layer gasket 220, such as the one shown in FIG. 10 and discussed above. The method starts with the step 300 of providing a wire 228 of metal, such as from the spool 242 shown in FIG. 11. Similar to the wire 28 discussed above, the wire 228 preferably has a diameter in the range of 0.3 to 0.6 mm and is preferably of galvanized steel. However, it should be appreciated that the wire 228 could be of a range of different formable materials and could have any desirable thickness. The method continues with the step 302 of bending the wire 228 into a predetermined enclosed shape, such as the circular shape shown in FIG. 12. Next, with the wire 228 in the enclosed shape, the method may continue with the step 304 of welding the ends of the wire 228 together. The ends of the wire are preferably resistance welded together. However, any desirable type of welding could be employed including, for example, gas-metal arc welding, induction welding, laser welding, etc. It should also be noted that welding the ends of the wire 228 may not be needed if, for example, the wire 228 is fed directly into an upper forming die.

Figure 13:
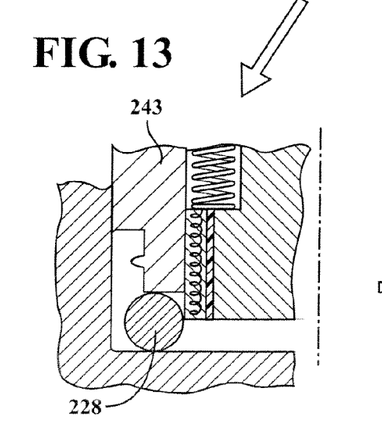
FIG. 13 is a cross-sectional view of the wire of FIG. 12 disposed in a forming die for shaping the wire into a compression limiter.
Figure 14:
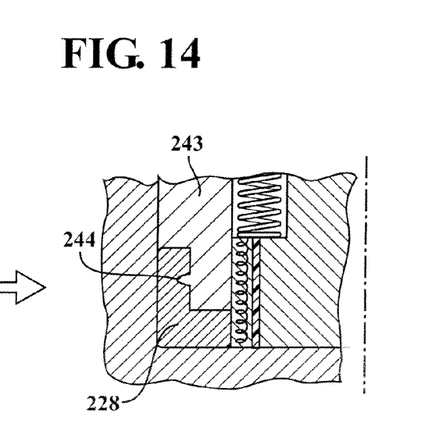
FIG. 14 is a cross-sectional view of the wire of FIG. 13 after being shaped in the forming die.
Figure 19:
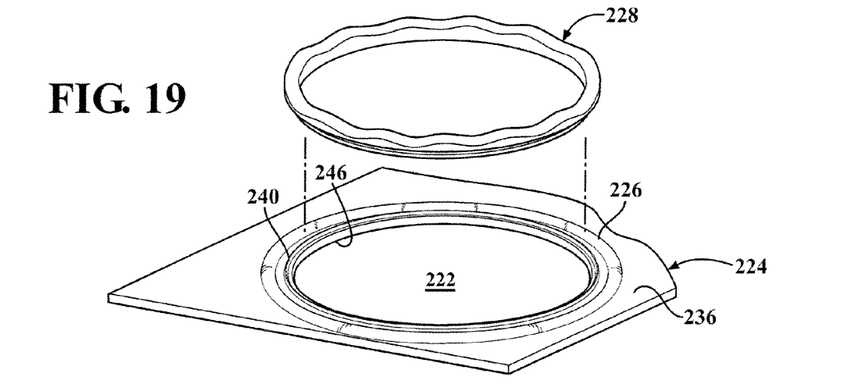
FIG. 19 is a perspective and exploded view of the shaped wire of FIG. 14 and the functional layer of FIG. 18.

Next, the wire 228 is loaded onto a forming die 243, such as the one shown in FIGS. 13 and 14, and the method continues with the step 306 of shaping the wire 228 into a compression limiter 228 having a generally flat top and a generally flat bottom. If desired, the compression limiter 228 could also be formed to have a variable topography, i.e. different thicknesses along its circumference (see FIG. 19). In the exemplary embodiment, after being shaped, the compression limiter 228 has a width of no greater than 1 mm. As shown in FIG. 14, the shaping step forms a groove 244 into the outer surface of the compression limiter 228. As will be discussed in further detail below, the groove 244 allows the compression limiter 228 to be connected to the functional layer 224. It should be appreciated that the compression limiter 228 could be shaped through a variety of other shaping processes if desired.

Figures 15, 16:
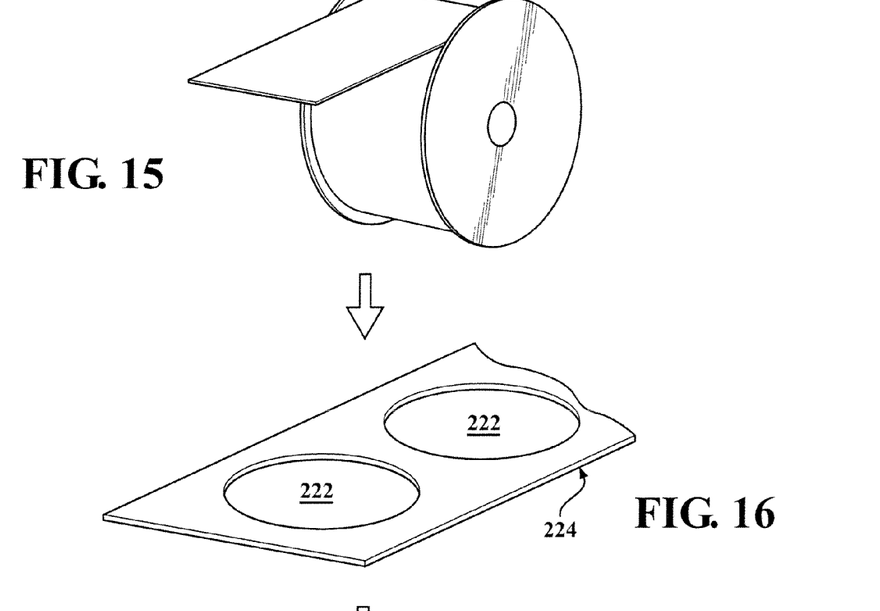
FIG. 15 is a perspective view of an exemplary ream of metal.
FIG. 16 is a perspective view of an exemplary functional layer having a plurality of openings.
Figure 17:
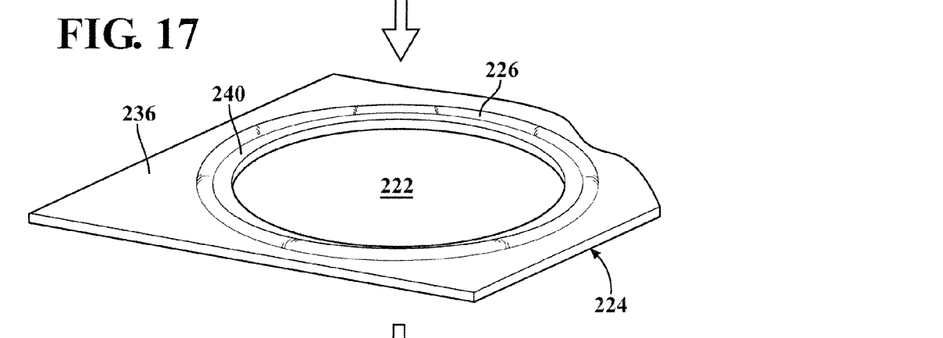
FIG. 17 is a perspective view of the functional layer of FIG. 16 after an embossing operation.
Figure 18:
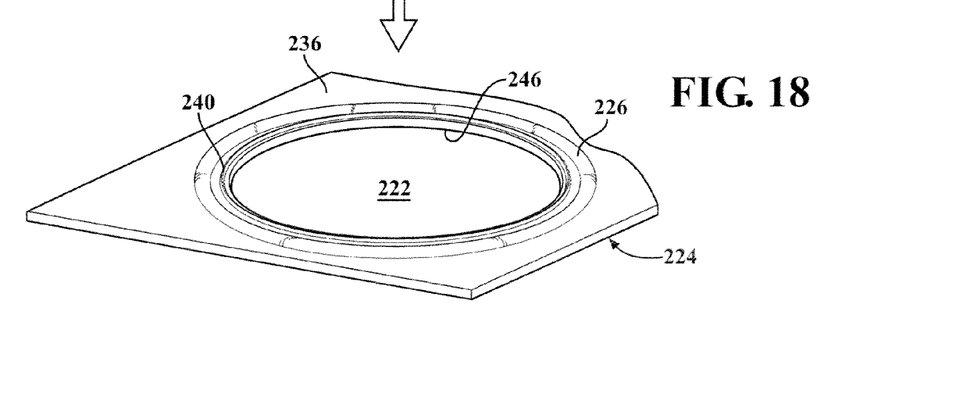
FIG. 18 is a perspective elevation view of the functional layer of FIG. 17 after a coining operation.

FIGS. 15-16 show the various steps in forming one of the exemplary functional layers 224. However, it should be appreciated that the functional layers 224, 225 could be formed through any desirable forming process. Next, the method continues with the step 308 of coining at least one of the functional layers 224 along the circumference of each of the openings 222 to present a lip 246 extending radially into the opening 222.

The compression limiter 228 is then joined to one of the functional layers 224 with the step 310 of engaging the lip 246 of the functional layer 224 into the groove 244 of the compression limiter 28. Referring back to FIG. 10, at least a portion of the compression limiter 228 extends radially outwardly toward the compression bead 226 and over the inner periphery portion 240 of the functional layer 224. The compression limiter 228 can be solidly attached to the functional layer 224 through snap-fitting, for example. Next, the method includes the step 312 of induction welding the compression limiter 228 to the functional layer 224. The method also includes the step 314 of overlying the functional layers 224, 225 on top of one other such that a portion of the compression limiter 228 is disposed between the inner periphery portions 240, 241 of the functional layers 224, 225. As discussed above, the compression limiter 228 prevents the compression beads 226, 227 from being fully flattened between the cylinder head and the engine block, thus allowing the gasket 220 to maintain a gas-tight seal.

Figure 21:
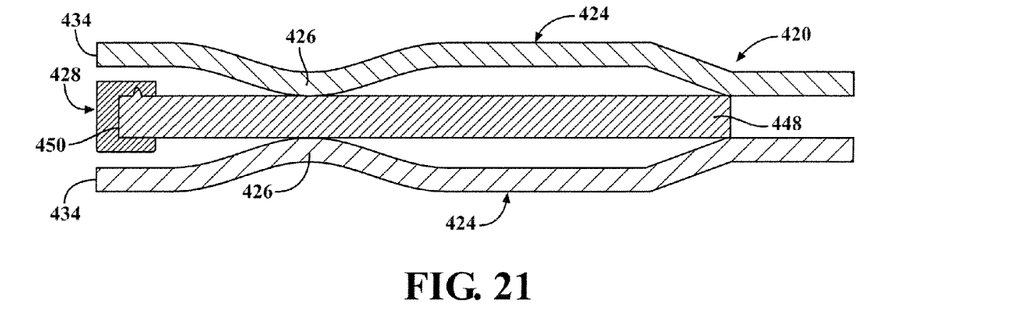
FIG. 21 is a cross-sectional view of yet another embodiment of a gasket.

Referring now to FIG. 21, an alternate embodiment of the gasket 420 is generally shown. In addition to the components described above, this gasket 420 further includes a distance layer 448 disposed between the opposing functional layers 424. The distance layer 448 extends from the inner periphery 450 of the distance layer 448 adjacent the inner peripheries 434 of the functional layers 424 radially outwardly past the compression beads 426 such that the compression beads 426 are compressed against the distance layer 448 rather than one another when the gasket 420 is compressed between a cylinder head and an engine block. In this embodiment the compression limiter 428 is in engagement with the distance layer 448 and extends axially on either side of the distance layer 448 such that at least a portion of it is disposed between the distance layer 448 and each of the functional layers 424. Similar to the embodiment described above, the compression limiter 428 ensures that both of the compression beads 426 extend outwardly from the plane 436 and remain elastically biased against the distance layer 448, even if the cylinder head is overloaded onto the engine block. It should be appreciated that, if the distance layer 448 is included, it might be desirable to include two separate compression limiters 448, each engaging the distance layer 448 and extending between opposing functional layers 424, rather than just one compression limiter 448 as shown. The distance layer 448 could have any desirable thickness and is preferably formed of a material having a high yield strength, such as 301 or 431 grade stainless steel. The distance layer 448 could extend radially by any desirable distance past the compression beads 426.

Figure 22:
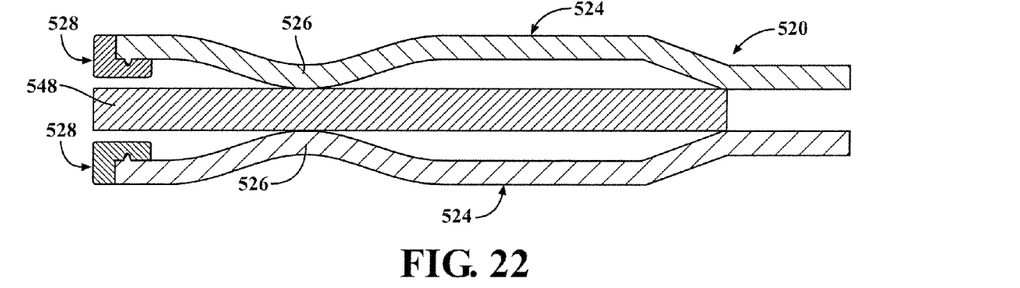
FIG. 22 is a cross-sectional view of still another embodiment of a gasket.

Referring now to FIG. 22, a yet another embodiment of the gasket 520 is generally shown. This exemplary embodiment includes two compression limiters 528, each being in engagement with one of the functional layers 524 and extending at least partially between its respective functional layer 524 and the distance layer 548. Like the other embodiments discussed above, the compression limiters 528 prevent full flattening of the compression beads 526.

It should be appreciated that the wire could also be fed directly into the upper die, shaped therein and welded to one of the layers. Such a process could further reduce manufacturing costs of the gasket.

Obviously, many modifications and variations of the present invention are possible in light of the above teachings and may be practiced otherwise than as specifically described while within the scope of the appended claims.

What is claimed is:

1. A method of forming a static gasket for establishing a gastight seal between two members to be clamped together, comprising the steps of:

bending a vertical wall into a gasket layer which extends at least partially along a horizontal plane which has an opening;

inserting a wire around the vertical wall;

compressing the wire against the layer after the wire is inserted around the vertical wall to at least partially flatten the wire;

resistance or induction welding the wire to the gasket layer; and forming a compression bead into said gasket layer or engaging said gasket layer with another layer than has a compression bead.

2. The method as set forth in claim 1 wherein the gasket layer is a functional layer, and further including the step of embossing the functional layer to present a compression bead.

3. The method as set forth III claim 1 further including the step of removing the vertical wall from the gasket layer.

4. A method of forming a static gasket for establishing a gas-tight seal between two members to be clamped together, comprising the steps of:
   drawing a vertical wall into a layer which extends at least partially along a horizontal plane;
   inserting a wire around the vertical wall;
   compressing the wire against the layer to at least partially flatten the wire; and
   resistance or induction welding the wire to the layer; and
   wherein the step of compressing the wire against the functional layer is further defined as coining the wire against the layer to at least partially flatten the wire.

5. A method of forming a static gasket for establishing a gas-tight seal between two members to be clamped together, comprising the steps of:
   providing a wire of metal;
   bending the wire into an enclosed shape;
   providing at least one functional layer having an opening and a compression bead;
   engaging the wire with the at least one functional layer around the opening;
   compressing the wire against the at least one functional layer after the wire is engaged with the at least one functional layer to at least partially flatten the wire; and
   welding the wire to the functional layer between the opening and the compression bead to prevent the compression bead from being flattened between the two members.

6. The method as set forth in claim 5 further including the step of forming the wire into a compression limiter and wherein the step of welding the compression limiter to the functional layer is further defined as induction welding or resistance welding the compression limiter to the functional layer.

7. The method as set forth in claim 6 further including the step of shaping the wire to have a generally flat top and a generally flat bottom before the step of induction welding the compression limiter to the functional layer.

8. The method as set forth in claim 7 wherein the step of shaping the wire is further defined as shaping the wire on a forming die.

9. The method as set forth in claim 7 wherein the step of shaping the wire is further defined as shaping the wire to have a variable topography.

10. The method as set forth in claim 7 further including the step of coining an edge of the functional layer to present a lip extending radially into the opening and wherein the compression limiter is at least partially welded to the lip.

11. The method as set forth in claim 6 further including the step of providing a second functional layer and further including the step of sandwiching the compression limiter between the functional layers.

12. The method as set forth in claim 5 wherein the step of bending the wire into an enclosed shape is further defined as bending the wire into a generally circular shape.

13. The method as set forth in claim 12 further including the step of welding the ends of the wire together.

14. The method as set forth in claim 5 wherein each of the openings in the functional layers is generally circular.

* * * * *